United States Patent
Nam et al.

(10) Patent No.: US 8,451,291 B2
(45) Date of Patent: May 28, 2013

(54) METHOD FOR DISPLAYING INFORMATION IN MOBILE TERMINAL

(75) Inventors: Hyo Jin Nam, Seoul (KR); June Seok Kim, Seoul (KR); Sun Young Yi, Seoul (KR); Nho Kyung Hong, Seoul (KR); Jae Joon Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 966 days.

(21) Appl. No.: 11/779,569

(22) Filed: Jul. 18, 2007

(65) Prior Publication Data

US 2008/0051152 A1    Feb. 28, 2008

(30) Foreign Application Priority Data

Aug. 23, 2006  (KR) .................. 10-2006-0079917

(51) Int. Cl.
*G09G 5/12*     (2006.01)
*H04M 1/725*    (2006.01)

(52) U.S. Cl.
CPC ................... *H04M 1/72519* (2013.01)
USPC ........................................... 345/619

(58) Field of Classification Search
CPC ................................... H04M 1/72519
USPC ........................................... 345/619
See application file for complete search history.

(56) References Cited

U.S. PATENT DOCUMENTS

| | | | | |
|---|---|---|---|---|
| 4,580,877 A * | 4/1986 | Washo | | 349/69 |
| 7,002,531 B2 * | 2/2006 | Koike | | 345/3.1 |
| 7,251,010 B2 * | 7/2007 | Miyasaka | | 349/151 |
| 2002/0054148 A1 | 5/2002 | Okada | | |
| 2003/0103021 A1 * | 6/2003 | Young et al. | | 345/76 |
| 2004/0041516 A1 * | 3/2004 | Watanabe et al. | | 313/498 |
| 2005/0007300 A1 * | 1/2005 | Kato | | 345/3.1 |
| 2005/0093850 A1 * | 5/2005 | Mori et al. | | 345/204 |
| 2005/0139674 A1 * | 6/2005 | Ishibashi et al. | | 235/454 |
| 2005/0200275 A1 * | 9/2005 | Tsai et al. | | 313/504 |
| 2005/0206600 A1 * | 9/2005 | Miyasaka et al. | | 345/92 |
| 2006/0088165 A1 * | 4/2006 | Yoon et al. | | 380/270 |
| 2006/0256224 A1 * | 11/2006 | Kitaura | | 348/333.01 |
| 2008/0051152 A1 * | 2/2008 | Nam et al. | | 455/566 |
| 2010/0265277 A1 * | 10/2010 | Takahara | | 345/690 |

FOREIGN PATENT DOCUMENTS

| | | |
|---|---|---|
| EP | 1 359 498 | 11/2003 |
| KR | 1020040033200 | 4/2004 |
| KR | 1020040093784 | 11/2004 |
| KR | 1020060004233 | 1/2006 |
| WO | WO 2004/079708 | 9/2004 |

\* cited by examiner

*Primary Examiner* — Javid A Amini
(74) *Attorney, Agent, or Firm* — The Farrell Law Firm, P.C.

(57) ABSTRACT

Provided is a method for displaying information in a mobile terminal having an Electro-Luminescence (EL) region. The method includes determining whether a request for setting an item to be displayed on the EL region is input in a state in which the mobile terminal is in an EL display mode; if a request is input, setting an item to be displayed on the EL region; and displaying contents corresponding to the set item on the EL region in the EL display mode. The method allows information related to a mobile terminal to be consistently displayed at a preset position while performing a specific function of the mobile terminal, thus enabling simultaneous display of the specific function and of information stored in the mobile terminal.

16 Claims, 15 Drawing Sheets

FIG. 9A     FIG. 9B
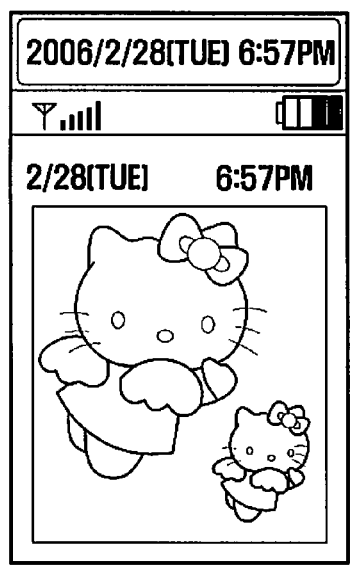 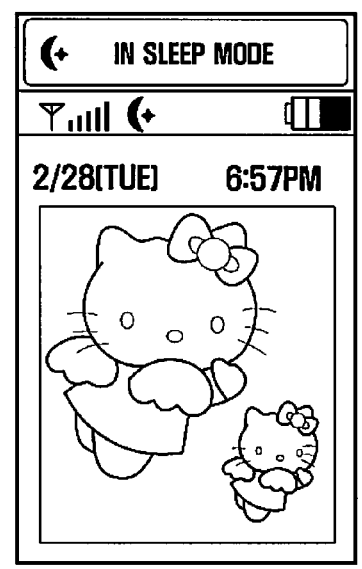
FIG. 9C
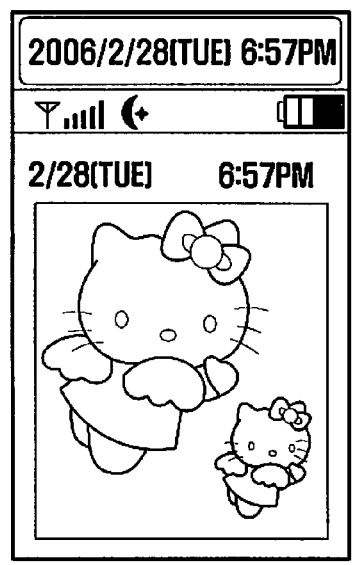

METHOD FOR DISPLAYING INFORMATION IN MOBILE TERMINAL

PRIORITY

This application claims priority under 35 U.S.C. §119(a) to a Korean Patent Application entitled "METHOD FOR DISPLAYING INFORMATION IN MOBILE TERMINAL" filed in the Korean Intellectual Property Office on Aug. 23, 2006 and assigned Serial No. 2006-0079917, the contents of which are incorporated herein by reference.

BACKGROUND OF THE INVENTION

1. Field of the Invention

The present invention relates to a method for displaying information in a mobile terminal, and more particularly, to a method for displaying information in a mobile terminal having a display containing an Electro-Luminescence (EL) area separately provided for displaying information in the mobile terminal.

2. Description of the Related Art

With the current advancement of wireless communication technology, a penetration rate of mobile terminals has rapidly increased. Due to the popularization of mobile terminals, mobile communication service providers provide a wide variety of services to meet diverse needs of their subscribers. For example, mobile communication service providers currently provide various services including wireless Internet access, Short Message Service (SMS), and schedule management functions as well as making/receiving calls without limitations in time and location.

In particular, a schedule management function allows a mobile terminal user to be notified of a specific scheduled event at a preset time by outputting an alarm sound or displaying a pop-up window containing information about the scheduled event. If the pop-up window containing the details of the scheduled event is displayed while a specific operation is in progress, the user has to cease the operation in order to view the details. This interrupts the flow of the operation in progress so that the user may need to restart the operation from the beginning.

Further, if a user sets a scheduled event in a mobile terminal, a pop-up window indicating information about the scheduled event is displayed for a predetermined time duration and automatically disappears after the predetermined time duration has elapsed. Thus, if the user cannot view their mobile terminal at a preset time, the user may forget the scheduled event.

SUMMARY OF THE INVENTION

In order to solve the above problems, the present invention provides a method for displaying information in a mobile terminal including a display containing an Electro-Luminescence (EL) area.

The present invention further provides a method for providing status/operation information about a mobile terminal while continuing to perform functions of the mobile terminal.

In accordance with the present invention, a method is provided for displaying information in a mobile terminal having a display unit containing an EL region for displaying information in the mobile terminal, which includes determining whether a request for setting an item to be displayed on the EL region is input in a state in which the mobile terminal is in an EL display mode; setting, if a request is input, an item to be displayed on the EL region; and displaying contents corresponding to the set item on the EL region in the EL display mode.

BRIEF DESCRIPTION OF THE DRAWINGS

The objects, features and advantages of the present invention will be more apparent from the following detailed description in conjunction with the accompanying drawings, in which:

FIGS. 9A through 9C are screen examples illustrating the operation displaying contents of FIG. 5;

DETAILED DESCRIPTION OF EXEMPLARY EMBODIMENTS

In the exemplary embodiments described below, an Electro-Luminescence (EL) region, separately provided at the top or bottom of a display unit of a mobile terminal during manufacturing of the mobile terminal, displays information about the status and operations of the mobile terminal. Alternatively, the EL region is disposed at the left or right side of the display unit.

For example, details corresponding to residual battery capacity, reception status, and message reception are displayed on the EL region as character strings. An EL display mode refers to a mode in which the EL region is activated to display information.

An event occurs when a status bar text for a mobile terminal has changed. Table 1 below lists the types of events. For example, if a broadcast message is received, a detail corresponding to the broadcast message "a broadcast message has arrived" is displayed on the EL region.

TABLE 1

| No | Type of icons | Name | Details displayed on EL region |
|----|---------------|------|-------------------------------|
| 1 | | MP3(Pause) | "MP3 playback is being paused" |
| 2 | | Reception reject | 1)Reception reject: after setting all numbers "All numbers are reception-rejected" 2) after setting an air plane mode, "Phone is in an airplane mode" |
| 3 | | No call services available | "Phone is outside the service area" |
| 4 | | Sleep mode | "Phone is in sleep mode" |
| 5 | | Silent mode | "Phone is set to silent mode" |
| 6 | | Ringtone after vibration | "Phone is set to ringtone after vibration mode" |
| 7 | | Vibration | "Phone is set to vibration mode" |
| 8 | | Voice bell | "Phone is set to voice bell mode" |
| 9 | | Urgent message reception | "Urgent message has arrived" |
| 10 | | Voice message reception | "Voice message has arrived" |
| 11 | | MMS message reception | "Multi-Q message has arrived" |
| 12 | | MMS message downloading | "Multi-Q message is being downloaded" |
| 13 | | CBS message | "Broadcast message has arrived" |
| 14 | | Cell phone lockdown | "Phone is set to lockdown" |
| 15 | | Bluetooth | "Phone is set to Bluetooth" |
| 16 | | InfraRed Data Association (IrDA) | 1) When remote controller is used, "Remote is being used" 2) When InfraRed (IR) communication is used, "IrDA communication is being performed." |
| 17 | | External memory use | "External memory is being used" |
| 18 | | MP3 (Play) | "MP3 is being played back" |
| 19 | | MP3 (Pause) | "MP3 playback is being paused" |

Hereinafter, exemplary embodiments of the present invention are described in detail with reference to the accompanying drawings. The same reference symbols are used throughout the drawings to identify the same or corresponding elements. Detailed descriptions of constructions or processes known in the art may be omitted to avoid obscuring the subject matter of the present invention.

Figure 1:
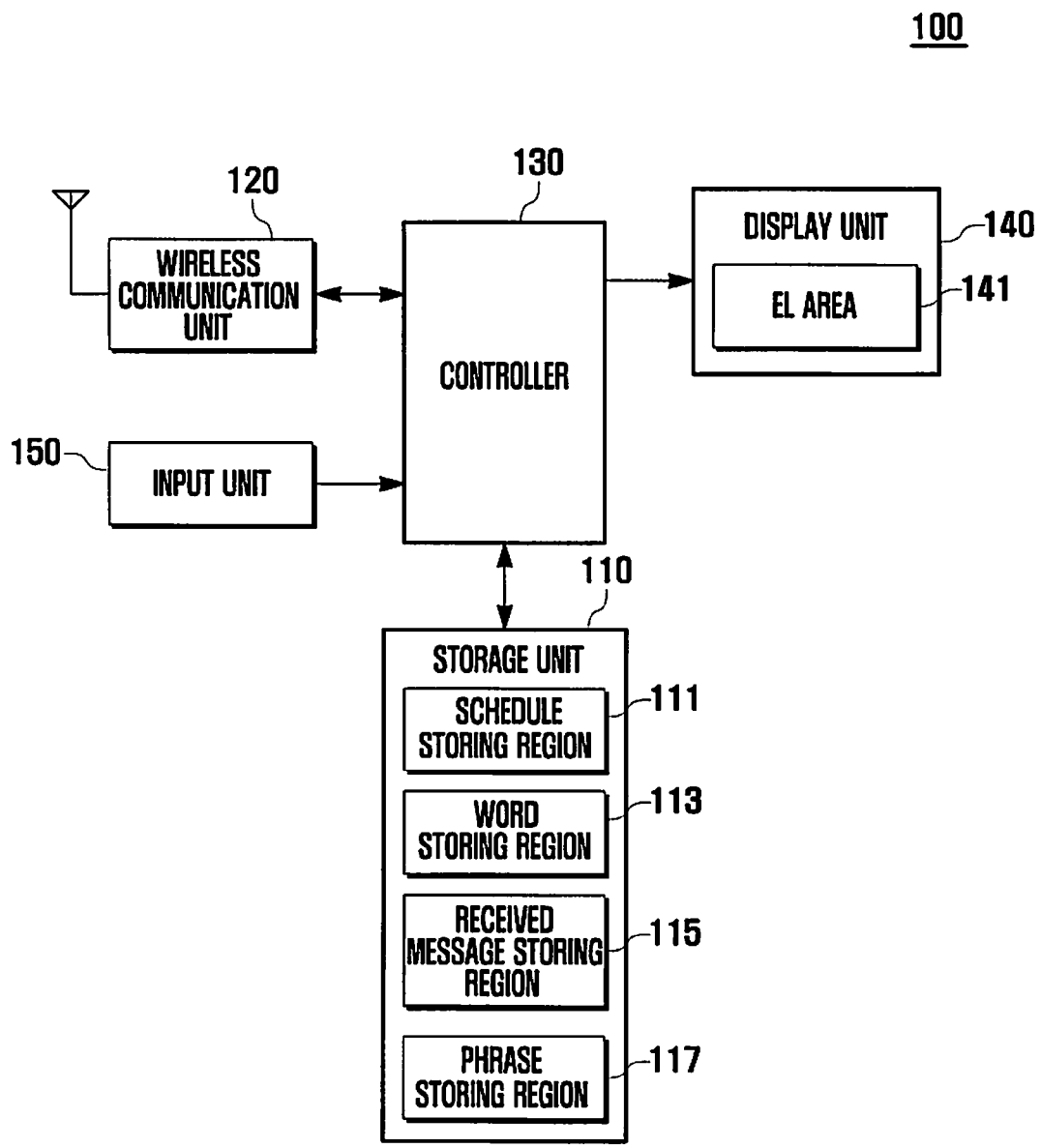
FIG. 1 is a schematic block diagram of a mobile terminal for using a method for displaying information according to the present invention.

FIG. 1 is a schematic block diagram of a mobile terminal 100 for using a method for displaying information according to the present invention.

Referring to FIG. 1, the mobile terminal 100 according to the present embodiment includes a storage unit 110, a wireless communication unit 120, a controller 130, a display unit 140, and an input unit 150.

The storage unit 110 includes a program memory for storing programs necessary for controlling the operation of the mobile terminal 100 and a data memory for storing data. In particular, the storage unit 110 stores details corresponding to events in a database form as illustrated in Table 1.

The storage unit 110 further includes a schedule storing region 111 for storing schedules predefined by a user's selection information, a word storing region 113 for storing words stored in a word list registered based on user selected information, a received message storing region for storing received messages, and a phrase storing region for storing phrases edited based on user selected information.

The wireless communication unit 120 is a transmitter/receiver circuit for transmitting and receiving voice and control information to and from a base station via a wireless link. In particular, the wireless communication unit 120 receives a message and a call from outside.

The controller 130 controls the overall state and operation of the mobile terminal 100, and may be a microprocessor or Digital Signal Processor (DSP). In particular, the controller 130 controls the display unit 140 to display contents corresponding to predefined items on an Electro-Luminescence (EL) region 141. More specifically, upon occurrence of an event when the mobile terminal 100 is in an EL display mode, the controller 130 searches the storage unit 110 for contents corresponding to the event. If the content is found, the controller 130 controls the display unit 140 to display the contents on the EL region 141. In this case, the controller 130 controls the display unit 140 to display the contents on the EL region 141 for a predetermined time duration. After the predetermined time duration has elapsed, the controller 130 controls the display unit 140 to again display contents corresponding to a predefined item.

The controller 130 also sets an item to be displayed on the EL region 141 in response to a signal for setting an item to be displayed on the EL region 141, for storage in the storage unit 110.

The display unit 140 displays the status and operation process of the mobile terminal 100. In particular, the display unit 140 includes the separate EL region 141 for displaying information in the mobile terminal 100, and is controlled by the controller 130 to display contents corresponding to selected items on the EL region 141. In this case, the display unit 140 may display information in various forms. Preferably, such information is displayed in the form of a sliding display. For example, the information may be displayed in such a manner that character strings slide across the EL region 141 while blinking, disappear after sliding, or sequentially change beginning with a first character.

The input unit 150 may be a keypad, a touch screen, or another device capable of selecting a desired function and inputting information. In particular, the input unit 150 receives a signal for setting an item to be displayed on the EL region 141 from the user.

Figure 2:
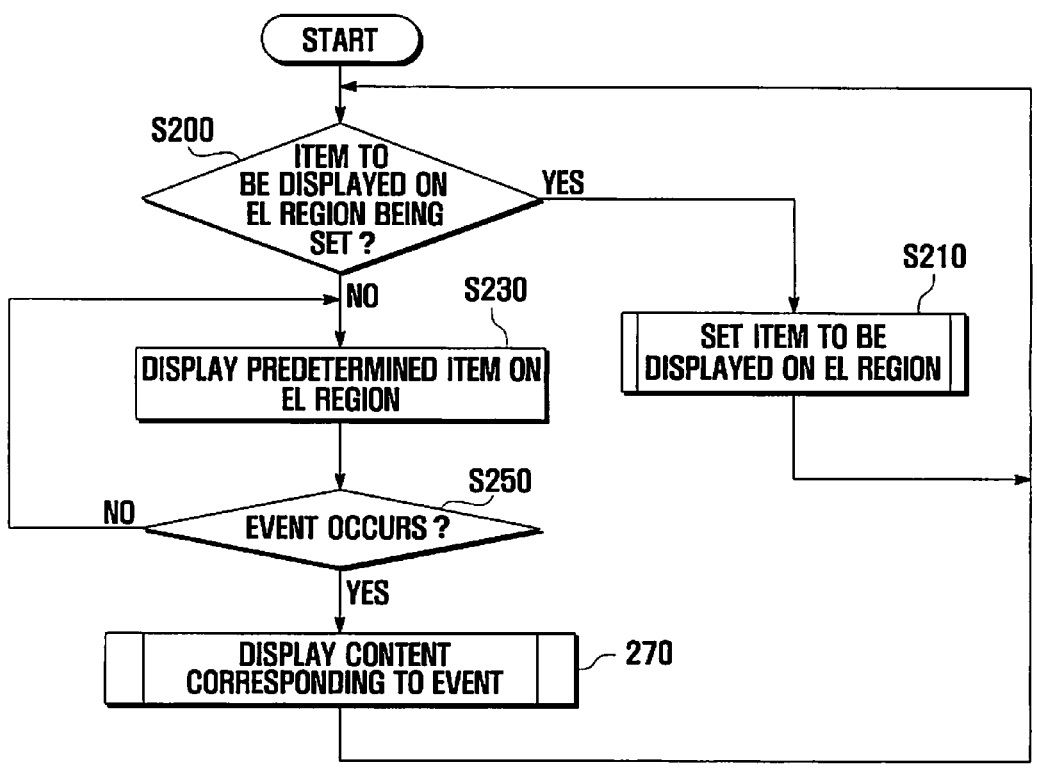
FIG. 2 is a flowchart illustrating a method for displaying information in a mobile terminal according to the present invention.

FIG. 2 is a flowchart illustrating a method for displaying information in the mobile terminal 100 according to the present invention.

Referring to FIGS. 1 and 2, if a signal for setting an item to be displayed on the EL region 141 is input, in step S200, the controller 130 sets the item to be displayed on the EL region 141, in step S210. Preferably, the item to be displayed on the EL region 141 includes at least one of a schedule, a phrase, a date/time, a message, and a word list. Step S210 is described in more detail later with reference to FIGS. 3A and 3B.

If a signal for setting an item to be displayed on the EL region 141 is not input at step S200, the controller 130 controls the display unit 140 to display contents corresponding to a predefined item on the EL region 141, in step S230. FIGS. 10 through 14 are screen examples illustrating the operation of displaying contents of step S230.

For example, if the predefined item is the schedule, the controller 130 controls the display unit 140 to sequentially display contents of the predefined schedule during a preset time period on the EL region 141, as illustrated in FIGS. 10A through 10E. Preferably, the preset time period is one of 'one day', 'one week', and 'one month'.

Figure 10A:
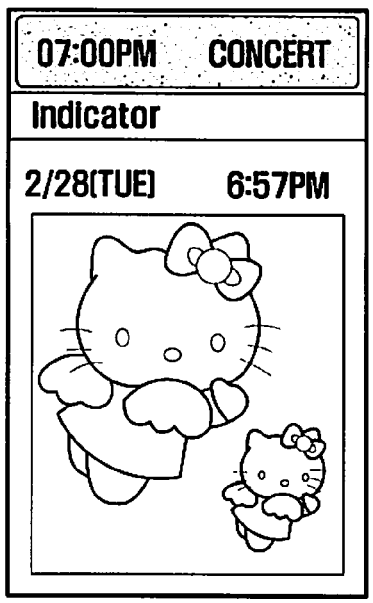
FIGS. 10A through 10E are screen examples illustrating an operation of displaying contents in the method of FIG. 2, in which schedule items are displayed.

Displaying contents of a predefined schedule in a case where the preset time period is 'one day' is hereinafter described. The schedule includes schedule categories of 'scheduled event', 'anniversary', and 'diary date'. In this case, 'scheduled event' includes 'concert' scheduled at '07:00 PM February 28' and 'class meeting' scheduled at '09:00 PM February 28', anniversary includes 'anniversary of founding' scheduled for 'February 28', and 'diary date' includes 'exhibition' scheduled for 'February 28' and 'wedding anniversary' scheduled for 'August 28'. The concert schedule time is closest to the current time when the current time is '6:57 PM' and it is therefore desirable to display the 'concert' in such a manner as to be easily seen at a glance as illustrated in FIG. 10A.

Figure 10B:
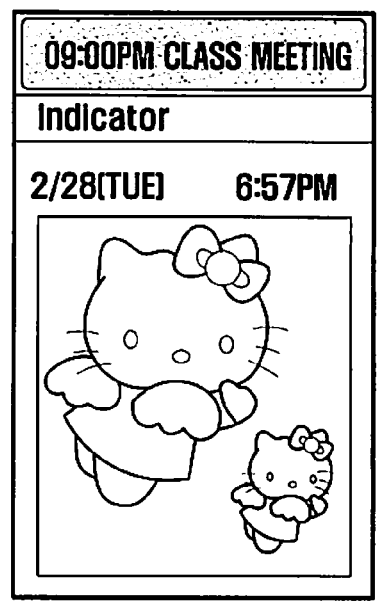
Figure 10C:
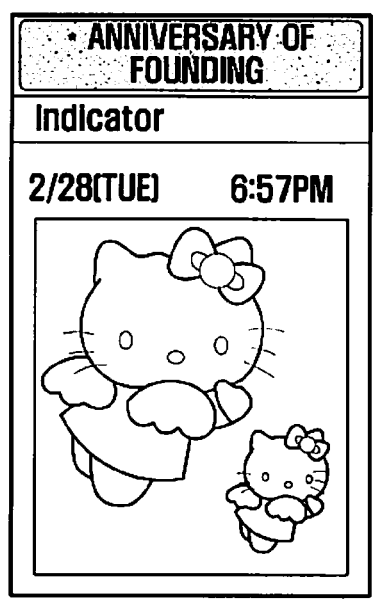
Figure 10D:
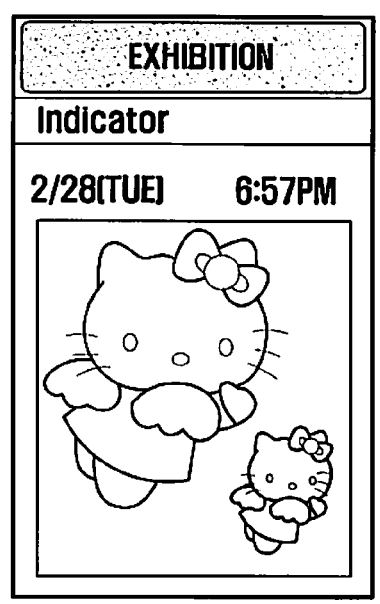
Figure 10E:
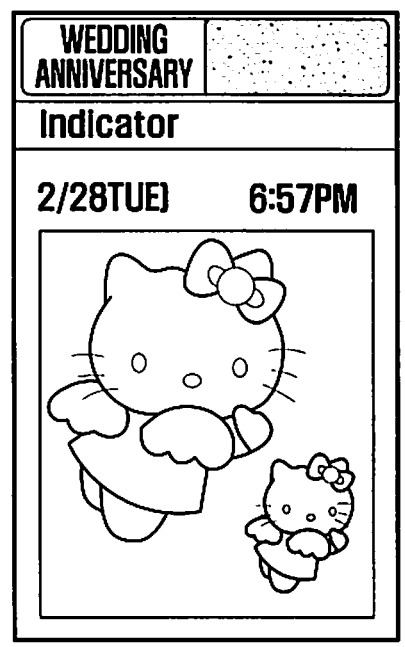

'Class meeting' is the first event scheduled after the 'concert', and therefore is displayed as illustrated in FIG. 10B. Further, 'anniversary of founding' registered as an 'anniversary' is scheduled for the current day, and therefore is displayed by filling the entire EL region 141 with a specific color as illustrated in FIG. 10C. Further, 'exhibition' registered as 'diary date' is also scheduled for the current day, and is displayed by filling the entire EL region 141 with a specific color as illustrated in FIG. 10D. 'Wedding anniversary' registered as 'diary date' is scheduled for a day other than the current day, i.e. August 28, and therefore is displayed by filling a portion of the entire EL region 141 with a specific color. The portion is that remaining after subtracting a portion corresponding to a difference between February 28 and August 28 from the EL region 141.

Figure 11:
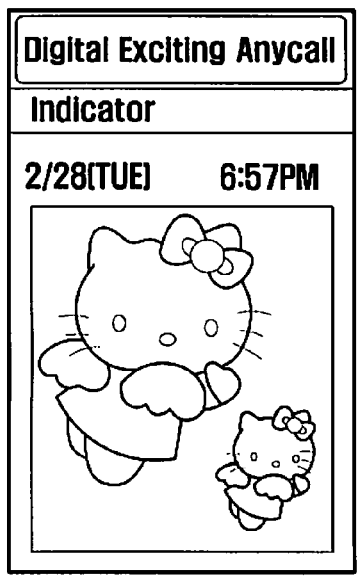
FIG. 11 is a screen example illustrating an operation of displaying contents in the method of FIG. 2, in which a phrase is displayed.

Referring to the screen example of FIG. 11, if the predefined item is a phrase, the controller 130 controls the display unit 140 to display a pre-edited phrase on the EL region 141. Preferably, the pre-edited phrase is displayed in the form of a sliding display. Further, the sliding display form may be modified according to user requirements. If there is no pre-edited phrase, a blank white space is displayed. Alternatively, a default phrase may be displayed instead of the blank white space.

Figure 12:
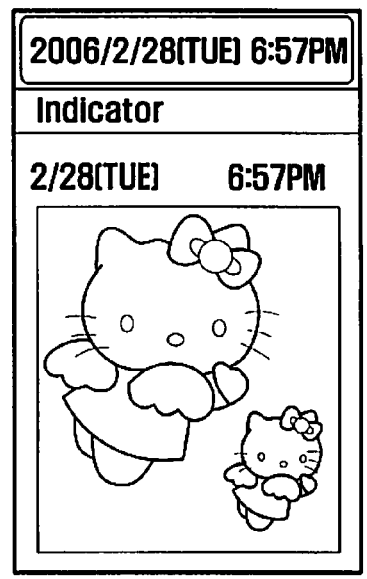
FIG. 12 is a screen example illustrating an operation of displaying contents in the method of FIG. 2, in which a date/time is displayed.

Referring to the screen example of FIG. 12, if the predefined item is a date and time, the controller 130 controls the display unit 140 to display the date/time set in the mobile terminal 100 on the EL region 141.

Figure 13:
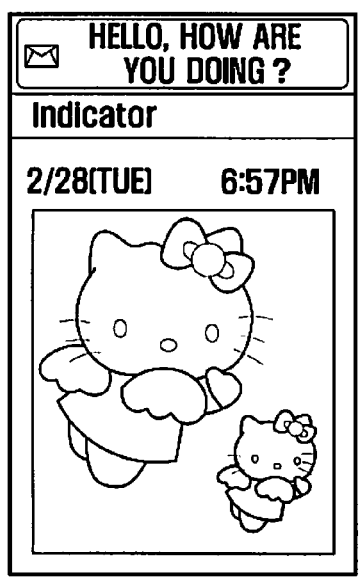
FIG. 13 is a screen example illustrating an operation of displaying a contents in the method of FIG. 2, in which a message is displayed.

Referring to the screen example of FIG. 13, if the predefined item is a message, the controller 130 controls the display unit 140 to display the contents of a received message on the EL region 141. In this case, the received message is a short text message that is displayed in the form of a sliding display. The manner in which the message is displayed may be modified according to user-selected information.

If a message other than the short text message, such as an urgent message, a voice message, a multimedia message, and a broadcast message, is received, the controller 130 searches the storage unit 110 for contents to be displayed on the EL region 141 corresponding to the type of the message and controls the display unit 140 to display the found content. For example, if a broadcast message is received, the controller 130 searches the storage unit 110 for contents corresponding to the broadcast message and displays character strings "Broadcast message has arrived" on the EL region 141.

Figure 14:
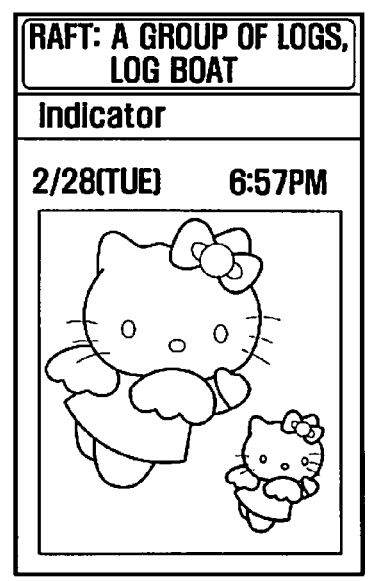
FIG. 14 is a screen example illustrating an operation of displaying a contents in the method of FIG. 2, in which a word list is displayed.

Referring to the screen example of FIG. 14, if the predefined item is a word list, the controller 130 controls the display unit 140 to sequentially display a predefined word and information associated with the word on the EL region 141. The word and information associated with the word are displayed in the form of a sliding display. The manner in which the word list is displayed may be modified according to user-selected information.

As shown in FIG. 2, after displaying the predefined item on the EL region 141 at step S230, the controller 130 checks whether an event occurs, in step S250. If an event occurs, the controller 130 controls the display unit 140 to display contents corresponding to the event, in step S270, and returns to step S200. Step S270 is described in more detail later with reference to FIGS. 5, 6A, and 6B.

If no event occurs at step S250, the controller 130 returns to step S230 and controls the display unit 140 to display the predefined item on the EL region 141.

Figure 3A:
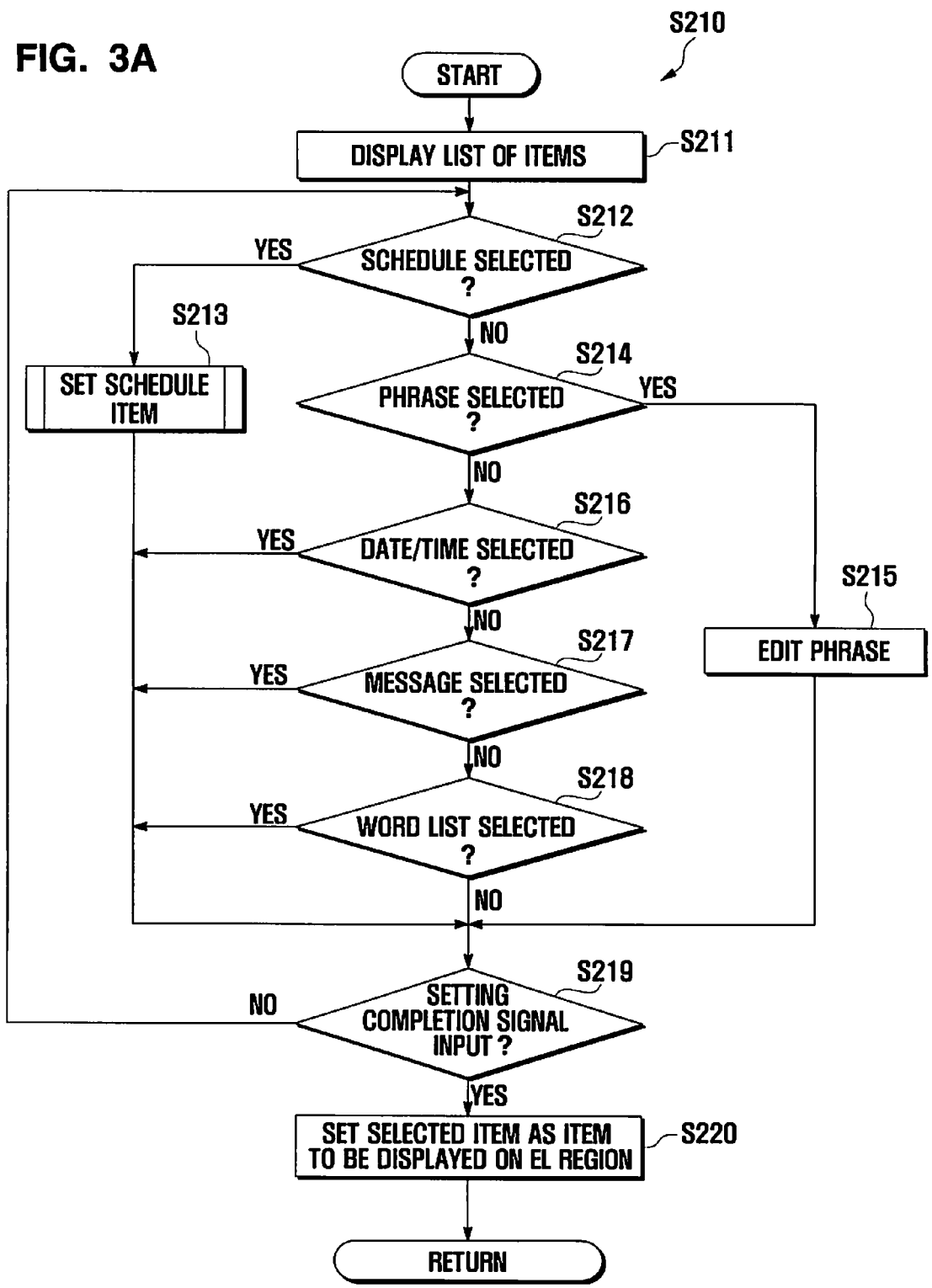
FIGS. 3A and 3B are detailed flowcharts illustrating examples of an operation of setting an item to be displayed on an Electro-Luminescence (EL) region according to the method of FIG. 2.
Figure 3B:
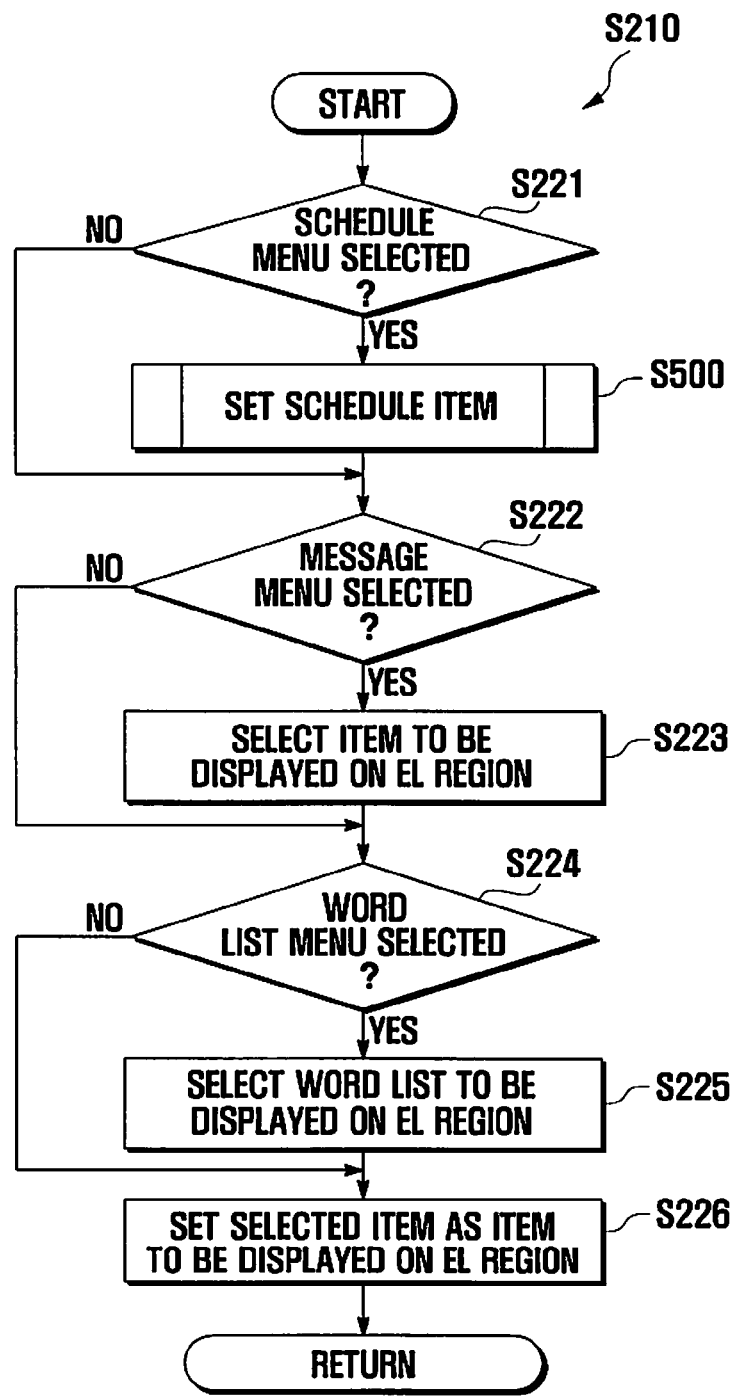

FIGS. 3A and 3B are detailed flowcharts illustrating examples of an operation of setting an item to be displayed on the EL region 141 according to the method of FIG. 2.

An example of step S210 of setting an item to be displayed on the EL region 141 is described with reference to FIGS. 1 and 3A. FIGS. 7A through 7E and FIGS. 8A and 8B are screen examples illustrating the operation of setting an item to be displayed of FIG. 3A.

Referring to FIGS. 1 and 3A, the controller 130 displays a list containing items to be displayed on the EL region 141, in step S211. The controller 130 checks whether a schedule selection signal is input by a user, in step S212. If a schedule selection signal is input, the controller 130 controls the display unit 140 to display a selected schedule item in a highlighted manner, as illustrated in the screen example of FIG. 7A, based on the user's selection information, and sets sub-items of the schedule item according to the user's selection information, in step S213. Step S213 is described in more detail later with reference to FIG. 4.

If a schedule selection signal is not input at step S212, the controller 130 checks whether a phrase selection signal is input by the user, in step S214. If a phrase selection signal is input, the controller 130 edits a phrase based on the user's selection information, in step S215. For example, as illustrated in the screen example of FIG. 7B, the controller 130 may edit a phrase corresponding to a selected phrase item based on the user's selection information.

If a phrase selection signal is not input at step S214, the controller 130 checks whether a date/time selection signal is input, in step S216. If a date/time selection signal is input, the controller 130 controls the display unit 140 to display a selected date/time item in a highlighted manner based on the user's selection information, as illustrated in the screen example of FIG. 7C.

If a date/time selection signal is not input at step S216, the controller 130 checks whether a message selection signal is input, in step S217. If a message selection signal is input, the controller 130 controls the display unit 140 to display a selected message item in a highlighted manner based on the user's selection information, as illustrated in the screen example of FIG. 7D. As another example, the controller 130 may access a message menu in response to the user's selection signal, as illustrated in the screen example of FIG. 8A, and set the contents of a received message so that it can be displayed on the EL region 141 in a highlighted manner, as illustrated in the screen example of FIG. 8B.

If a message selection signal is not input at step S217, the controller checks whether a word list selection signal is input, in step S218. If a word list selection signal is input, the controller 130 controls the display unit 140 to display a selected word list item in a highlighted manner based on the user's selection information, as illustrated in the screen example of FIG. 7E.

The controller 130 checks whether a setting completion signal is input, in step S219. If a setting completion signal is input, the controller 130 sets the selected item to be displayed on the EL region 141 and controls the storage unit 110 to store the selected item, in step S220.

If a date/time selection signal, a message selection signal, or a word list selection signal is input at steps S216, S217, or S218, respectively, the controller 130 checks whether a setting completion signal is input at step S219.

If a setting completion signal is not input at step S219, the controller 130 returns to step S212.

By performing the steps in this way, at least one item is selected for display on the EL region 141.

Another example of step S210 of setting an item to be displayed on the EL region 141 is described with reference to FIGS. 1 and 3B.

Referring to FIGS. 1 and 3B, the controller 130 checks whether a schedule menu selection signal is input, in step S221. If a schedule menu selection signal is input, the controller 130 sets items of the schedule menu according to user's selection information, in step S500.

Step S500 is described in more detail later with reference to FIG. 4.

After setting the items of the schedule menu, the controller 130 checks whether a message menu selection signal is input, in step S222.

If a schedule menu selection signal is not input at step S221, the controller 130 performs step S222.

If a message menu selection signal is input at step S222, the controller 130 selects a message to be displayed on the EL region 141 according to the user's selection information, in step S223.

After selecting the message, the controller 130 checks whether a word list menu selection signal is input, in step S224.

If a message menu selection signal is not input at step S222, the controller 130 performs step S224.

If a word list menu selection signal is input at step S224, the controller 130 selects a word list to be displayed on the EL region 141 according to the user's selection information, in step S225.

After performing step S225, the controller 130 sets the selected item as an item to be displayed on the EL region 141, in step S226.

If a word list menu selection signal is not input at step S224, the controller 130 performs step S226.

Figure 4:
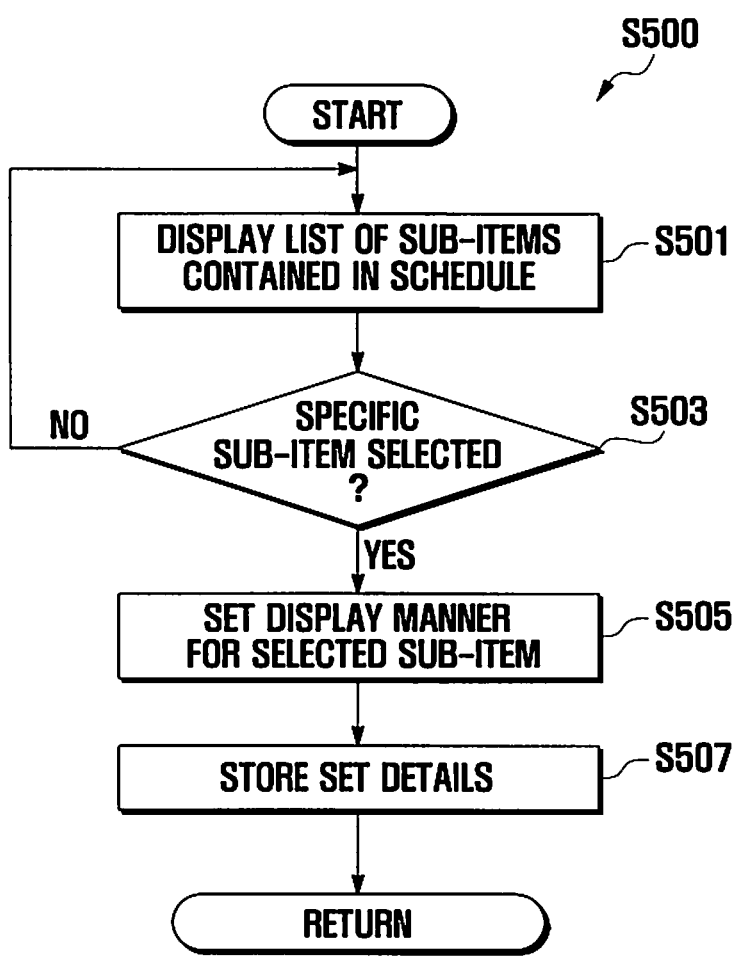
FIG. 4 is a flowchart illustrating a step of setting a schedule item according to the operations of FIGS. 3A and 3B.

FIG. 4 is a flowchart illustrating a step of setting a schedule item according to the operations of FIGS. 3A and 3B.

Step S500 for setting a schedule item according to the operation of FIG. 3B is described as follows with reference to FIGS. 1 and 4.

The controller 130 controls the display unit 140 to display a list of schedule sub-items, in step S501. For example, the sub-items may include a 'scheduled event', an 'anniversary', and a 'diary date'. The controller checks whether a specific sub-item is selected among the list of schedule sub-items, in step S503. If a specific sub-item is selected, the controller 130 sets a manner in which the selected sub-item is to be displayed, in step S505. In this case, the specific sub-item may be at least one.

The specific sub-item is displayed in the form of a sliding display. According to the set manner of display, the information may be displayed in such a manner, for example, that character strings slide across the EL region 141 while blinking, disappear after sliding, or sequentially change beginning with a first character.

The controller 130 then controls the storage unit 110 to store the selected sub-item and the manner in which the selected sub-item is to be displayed, in step S507.

Step S213 for setting a schedule item according to the operation of FIG. 3 is performed in an identical manner to step S500 according to the operation of FIG. 3B, as illustrated in FIG. 4.

Figure 5:
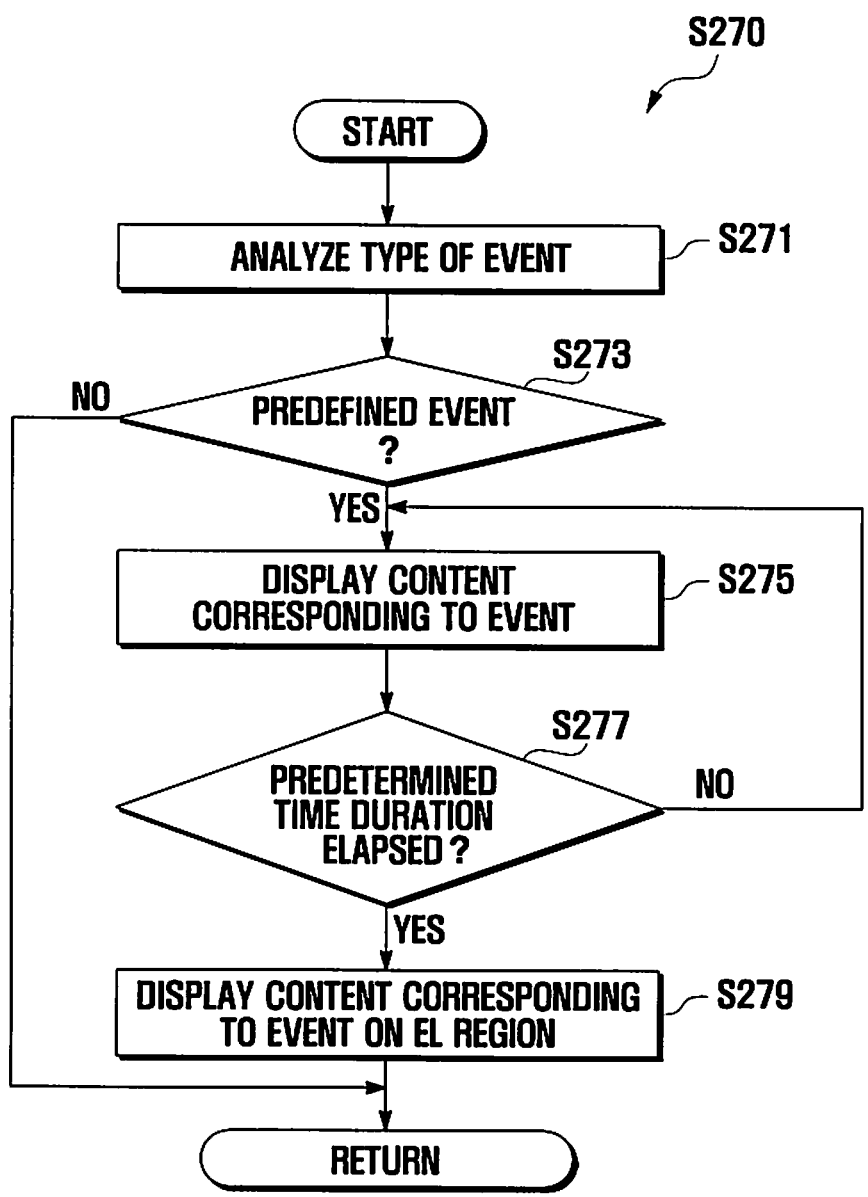
FIG. 5 is a flowchart illustrating an example of an operation of displaying contents corresponding to an event in the method for displaying information of FIG. 2.

FIG. 5 is a flowchart illustrating an example of an operation of displaying contents corresponding to an event in the method for displaying information of FIG. 2.

Step S270 of displaying contents corresponding to an event is described as follows with reference to FIGS. 1 and 5.

The controller 130 analyzes the type of an event being generated, in step S271, and checks whether the analyzed event is a predefined event, in step S273. The types of events are specified in Table 1 above.

If the analyzed event is a predefined event, the controller 130 controls the display unit 140 to display contents corresponding to the event on the EL region 141, in step S275. The controller 130 checks whether a predetermined time duration has elapsed, in step S277. If a predetermined time duration has not elapsed, the process returns to step S275 and the controller 130 continues to control the display unit 140 to display the contents corresponding to the event. In this example, the predetermined time duration refers to the amount of time required to repeatedly display the contents corresponding to the event three times.

When the controller 130 determines that the predetermined time duration has elapsed at step S277, the controller 130 controls the display unit 140 to display on the EL region 141 contents corresponding to an item set to be displayed on the EL region 141, in step S279.

For example, the controller 130 controls the display unit 140 to display contents corresponding to a predefined item, as illustrated in FIG. 9A. If a sleep mode is set according to the user's selection information, the controller 130 controls the display unit 140 to display contents indicating the sleep mode is being set on the EL region 141, as illustrated in FIG. 9B. After the predetermined time duration has elapsed, the controller 130 controls the display unit 140 to display a predefined item on the EL region 141 as illustrated in FIG. 9C.

Figure 6A:
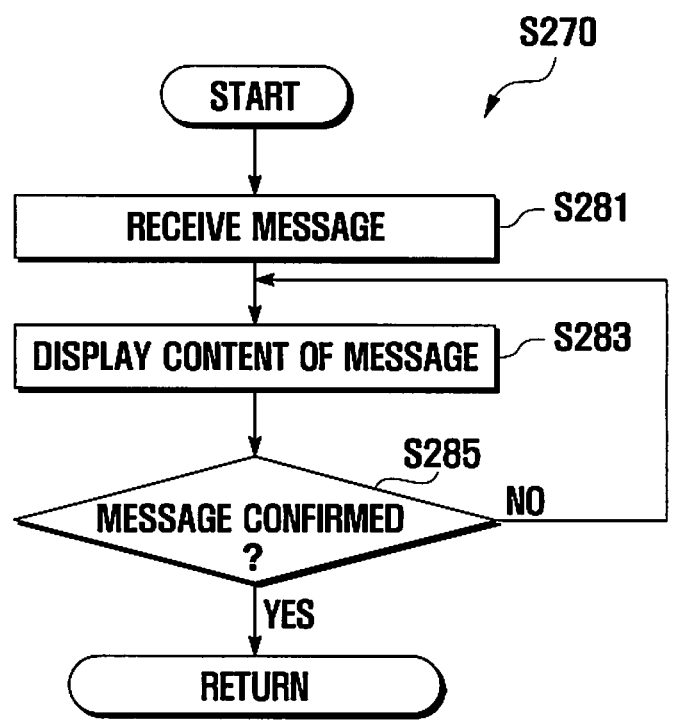
FIGS. 6A and 6B are flowcharts illustrating further examples of an operation of displaying contents corresponding to an event in the method of FIG. 2.
Figure 6B:
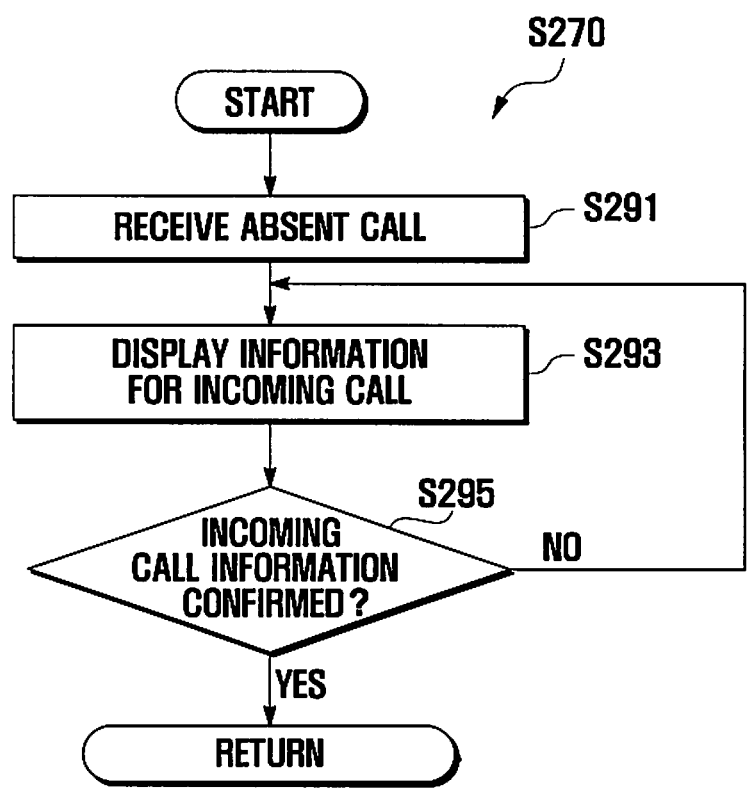
Figure 7A:
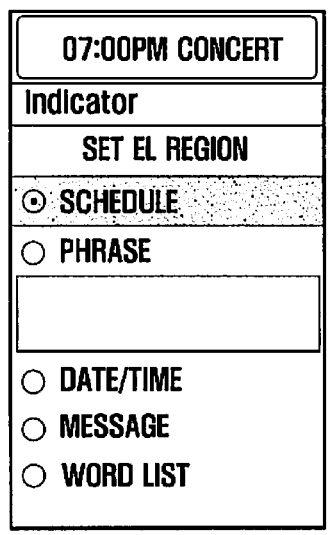
FIGS. 7A through 7E are screen examples illustrating the operation of setting an item to be displayed of FIG. 3A.
Figure 7B:
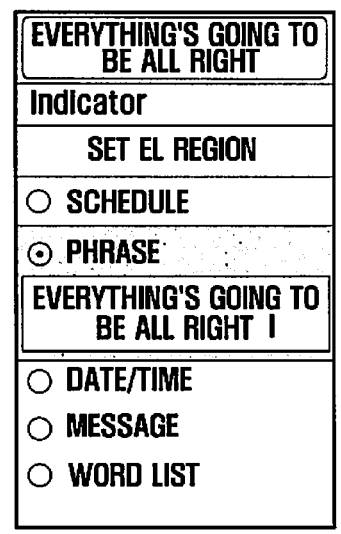
Figure 7C:
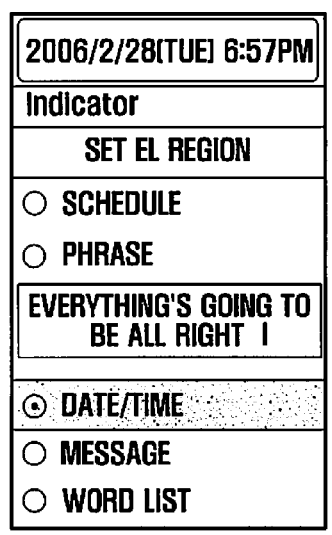
Figure 7D:
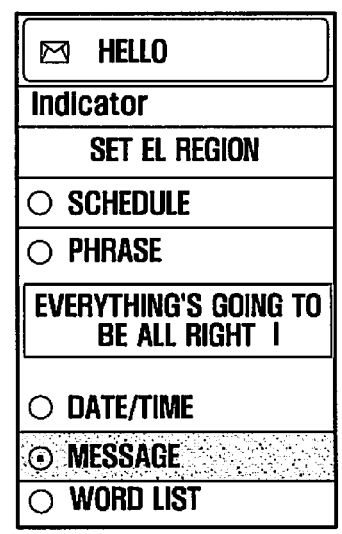
Figure 7E:
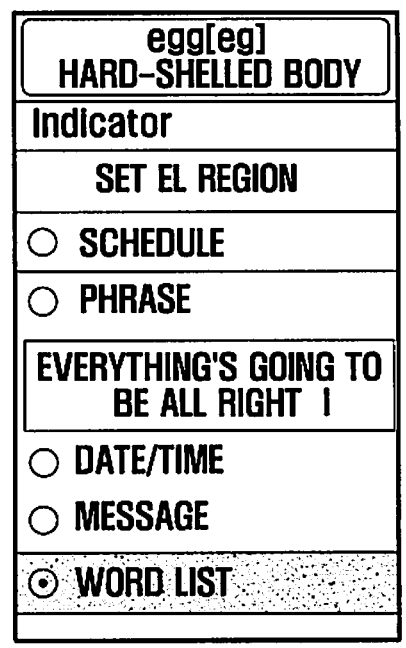
Figure 8A:
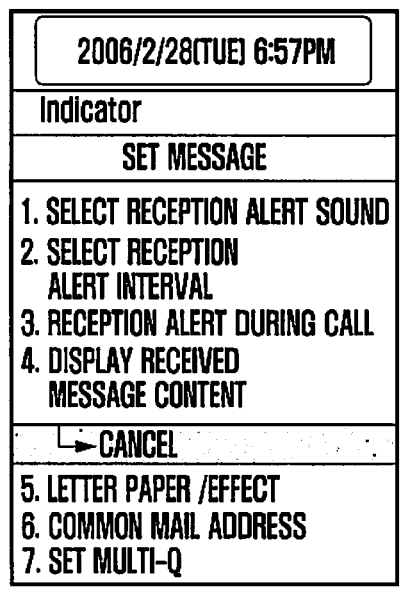
FIGS. 8A and 8B are screen examples illustrating the operation of setting an item to be displayed of FIG. 3A.
Figure 8B:
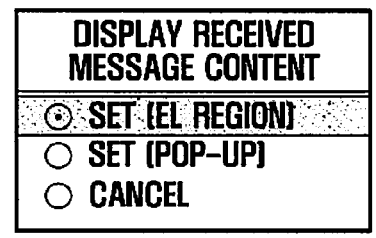

FIGS. 6A and 6B are flowcharts illustrating further examples of an operation of displaying contents corresponding to an event in the method of FIG. 2.

Step S270 of displaying contents corresponding to an event in a case where the event is a short message is described as follows with reference to FIGS. 1 and 6A.

Referring to FIGS. 1 and 6A, the controller 130 controls the wireless communication unit 120 to receive a short message, in step S281. The controller 130 controls the display unit 140 to display contents of the received message on the EL region 141, in step S283. More specifically, the controller 130 may control the display unit 140 to display contents of the received message, message reception time, and caller information contained in the received message.

In a case where the controller 130 controls the wireless communication unit 120 to receive a message other than a short message, the controller 130 controls the display unit 140 to display contents corresponding to the type of the message on the EL region 141.

While displaying the contents of the message, the controller 130 checks whether a message confirmation signal is input, in step S285. If a message confirmation signal is not input, the process returns to step S283 and the controller 130 continues to control the display unit 140 to display the contents of the message on the EL region 141.

If a message confirmation signal is input at step S285, the controller 130 checks whether an unconfirmed message exists. If an unconfirmed message exists, the controller 130 controls the display unit 140 to display the contents of the message on the EL region 141. Further, if an unconfirmed message does not exist, the controller 130 checks whether there is another item predefined to be displayed on the EL region 141. If a predefined item other than the message exists, the controller 130 controls the display unit 140 to display contents corresponding to the predefined item.

If a predefined item other than the message does not exist, the controller 130 displays the EL region 141 as a blank space.

Step S270 of displaying contents corresponding to an event in a case where the event is an absent call is described as follows with reference to FIGS. 1 and 6B.

Referring to FIGS. 1 and 6B, if the controller 130 controls the wireless communication unit 120 to receive an incoming call during absence, in step S291, the controller 130 controls the display unit 140 to display information corresponding to the incoming call on the EL region 141, in step S293.

While displaying the incoming call information, the controller 130 checks whether an incoming call information confirmation signal is input, in step S295. If an incoming call information confirmation signal is not input, the process returns to step S293 and the controller 130 continues to control the display unit 140 to display the incoming call information on the EL region 141.

If an incoming call information confirmation signal is input at step S295, the controller 130 controls the display unit 140 to display contents corresponding to the predefined item on the EL region 141.

As described above, the present invention allows information related to a mobile terminal to be consistently displayed at a preset position while performing a specific function of the mobile terminal, thus enabling simultaneous display of the specific function and of information stored in the mobile terminal. For example, if a predefined schedule item is displayed while editing character strings, a user can continuously edit the character strings by allowing the schedule item to be displayed at a preset position.

While the present invention has been particularly shown and described with reference to embodiments thereof, it will be understood by those of ordinary skill in the art that various changes and modifications in form and details may be made without departing from the spirit and scope of the present invention as defined by the following claims.

What is claimed is:

1. A method for displaying information in a mobile terminal having a display unit containing an Electro-Luminescence (EL) region for displaying information in the mobile terminal, the method comprising:
    setting an item to be displayed on the EL region;
    displaying contents corresponding to the set item on the EL region, together with display of a specific function screen currently being performed on a region of the display unit separate from the EL region;
    determining whether an event occurs and displaying contents corresponding to the event on the EL region while continuing to display the specific function screen that is currently performed on the region of the display unit separate from the EL region; and
    after lapse of a predetermined time duration, returning to displaying the contents corresponding to the set item on the EL region while continuing to display the specific function screen on the region of the display unit separate from the EL region,
    wherein the specific function screen includes a status bar for the mobile terminal, and
    wherein the event occurs when the status bar changes.

2. The method of claim 1, wherein the step of setting the item to be displayed on the EL region comprises:
    displaying a list containing at least one item; and
    selecting a specific item among the list in response to a selection signal.

3. The method of claim 2, wherein the specific item is at least one of a schedule, a phrase, a date/time, a word list, and a message.

4. The method of claim 3, wherein displaying contents corresponding to the set item on the EL region comprises displaying, when the set item is the schedule, displaying the contents of the schedule during a preset time period from within the time period of a prestored schedule, in a sequential order.

5. The method of claim 4, wherein the preset time period is one of one day, one week, and one month.

6. The method of claim 4, wherein the schedule is at least one of a diary-date, a scheduled event, and an anniversary.

7. The method of claim 4, wherein displaying contents corresponding to the set item on the EL region further comprises, when no content exists, displaying a blank space.

8. The method of claim 3, wherein displaying contents corresponding to the set item on the EL region comprises, when the set item is the phrase, displaying a phrase obtained by editing.

9. The method of claim 8, wherein the edited phrase is displayed in the form of a sliding display.

10. The method of claim 8, wherein displaying contents corresponding to the set item on the EL region further comprises, when no edited phrase exists, displaying a blank space.

11. The method of claim 3, wherein the message is one of a short message, an urgent message, a voice message, a multimedia message, and a broadcast message.

12. The method of claim 11, wherein displaying contents corresponding to the set item on the EL region comprises:
    when the set item is the message and an unconfirmed message exists, displaying contents of the last received unconfirmed message;
    determining whether the unconfirmed message exists in response to a signal for confirming the contents of the displayed unconfirmed message;
    when the unconfirmed message exists, displaying contents of the last received unconfirmed message; and
    when no unconfirmed message exists, displaying a blank space.

13. The method of claim 12, wherein the message contents is displayed in the form of a sliding display.

14. The method of claim 11, wherein, when the message is other than the short message, the message indicates that a message is received.

15. The method of claim 3, wherein displaying a content corresponding to the set item on the EL region further comprises when the set item is the date/time, displaying a date/time set in the mobile terminal.

16. The method of claim 3, wherein displaying a content corresponding to the set item on the EL region comprises when the set item is a word list, displaying words prestored in the mobile terminal in a sequential order in the form of a sliding display.

* * * * *